United States Patent [19]
Kojima

[11] Patent Number: 5,231,667
[45] Date of Patent: Jul. 27, 1993

[54] SCRAMBLING/DESCRAMBLING CIRCUIT

[75] Inventor: Yuichi Kojima, Kanagawa, Japan

[73] Assignee: Sony Corporation, Tokyo, Japan

[21] Appl. No.: 802,327

[22] Filed: Dec. 4, 1991

[30] Foreign Application Priority Data

Dec. 10, 1990 [JP] Japan .................. 2-409771

[51] Int. Cl.⁵ .......................... H04L 9/26; H04L 9/28
[52] U.S. Cl. ........................ 380/28; 380/42; 380/46; 380/49
[58] Field of Search ............. 380/28, 42, 49, 44, 380/46

[56] References Cited

U.S. PATENT DOCUMENTS

| | | |
|---|---|---|
| 3,784,743 | 1/1974 | Schroeder . |
| 4,165,444 | 8/1979 | Gordon . |
| 4,797,921 | 1/1989 | Shiraishi ............... 380/28 |
| 4,815,130 | 3/1989 | Lee et al. ............. 380/42 X |
| 4,965,881 | 10/1990 | Dilley et al. ......... 380/46 X |

FOREIGN PATENT DOCUMENTS 265180 4/1988 European Pat. Off. .
331115 9/1989 European Pat. Off. .

OTHER PUBLICATIONS

"IEEE Transaction on Computers", vol. 39, No. 2, Feb. 1990, pp. 258-262 (Wang et al.).
"Electronik", vol. 32, No. 26, Dec. 1983, pp. 67-70, (Hermes et al.).
"NTZ", vol. 45, No. 5, May 1988, pp. 270-275 (Hahan et al.).

Primary Examiner—Gilberto Barrón, Jr.
Attorney, Agent, or Firm—Jay H. Maioli; Lewis H. Eslinger

[57] ABSTRACT

A scrambling/descrambling circuit that may be manufactured as a CMOS arrangement in LSI format and free of constraints on the degree of the generating polynomial involved. Scrambled (or descrambled) "m" bits of data output by registers are multiplied by multiplication circuits by a factor of the generating element $\alpha^m$ of the generating polynomial. The multiplied data are input back to the registers. The scrambled "m" bits of data are supplied to "m" exclusive-OR gates for exclusive-OR operation with input data.

9 Claims, 10 Drawing Sheets

$x^5 + x^2 + 1$ GALOIS GROUP

|  | $\alpha^4$ | $\alpha^3$ | $\alpha^2$ | $\alpha^1$ | $\alpha^0$ |
|---|---|---|---|---|---|
| 0 | 0 | 0 | 0 | 0 | 0 |
| $\alpha^0$ | 0 | 0 | 0 | 0 | 1 |
| $\alpha^1$ | 0 | 0 | 0 | 1 | 0 |
| $\alpha^2$ | 0 | 0 | 1 | 0 | 0 |
| $\alpha^3$ | 0 | 1 | 0 | 0 | 0 |
| $\alpha^4$ | 1 | 0 | 0 | 0 | 0 |
| $\alpha^5$ | 0 | 0 | 1 | 0 | 1 |
| $\alpha^6$ | 0 | 1 | 0 | 1 | 0 |
| $\alpha^7$ | 1 | 0 | 1 | 0 | 0 |
| $\alpha^8$ | 0 | 1 | 1 | 0 | 1 |
| $\alpha^9$ | 1 | 1 | 0 | 1 | 0 |
| $\alpha^{10}$ | 1 | 0 | 0 | 0 | 1 |
| $\alpha^{11}$ | 0 | 0 | 1 | 1 | 1 |
| $\alpha^{12}$ | 0 | 1 | 1 | 1 | 0 |
| $\alpha^{13}$ | 1 | 1 | 1 | 0 | 0 |
| $\alpha^{14}$ | 1 | 1 | 1 | 0 | 1 |
| $\alpha^{15}$ | 1 | 1 | 1 | 1 | 1 |
| $\alpha^{16}$ | 1 | 1 | 0 | 1 | 1 |
| $\alpha^{17}$ | 1 | 0 | 0 | 1 | 1 |
| $\alpha^{18}$ | 0 | 0 | 0 | 1 | 1 |
| $\alpha^{19}$ | 0 | 0 | 1 | 1 | 0 |
| $\alpha^{20}$ | 0 | 1 | 1 | 0 | 0 |
| $\alpha^{21}$ | 1 | 1 | 0 | 0 | 0 |
| $\alpha^{22}$ | 1 | 0 | 1 | 0 | 1 |
| $\alpha^{23}$ | 0 | 1 | 1 | 1 | 1 |
| $\alpha^{24}$ | 1 | 1 | 1 | 1 | 0 |
| $\alpha^{25}$ | 1 | 1 | 0 | 0 | 1 |
| $\alpha^{26}$ | 1 | 0 | 1 | 1 | 1 |
| $\alpha^{27}$ | 0 | 1 | 0 | 1 | 1 |
| $\alpha^{28}$ | 1 | 0 | 1 | 1 | 0 |
| $\alpha^{29}$ | 0 | 1 | 0 | 0 | 1 |
| $\alpha^{30}$ | 1 | 0 | 0 | 1 | 0 |

FIG. 3

REGISTER OUTPUT

| $x^4$ | $x^3$ | $x^2$ | $x$ | 1 |
|---|---|---|---|---|
| 1 | 1 | 1 | 1 | 1 |
| 0 | 1 | 1 | 1 | 1 |
| 0 | 0 | 1 | 1 | 1 |
| 0 | 0 | 0 | 1 | 1 |
| 1 | 0 | 0 | 0 | 1 |
| 1 | 1 | 0 | 0 | 0 |
| 0 | 1 | 1 | 0 | 0 |
| 1 | 0 | 1 | 1 | 0 |
| 1 | 1 | 0 | 1 | 1 |
| 1 | 1 | 1 | 0 | 1 |
| 0 | 1 | 1 | 1 | 0 |
| 1 | 0 | 1 | 1 | 1 |
| 0 | 1 | 0 | 1 | 1 |
| 1 | 0 | 1 | 0 | 1 |
| 0 | 1 | 0 | 1 | 0 |
| 0 | 0 | 1 | 0 | 1 |
| 0 | 0 | 0 | 1 | 0 |
| 0 | 0 | 0 | 0 | 1 |
| 1 | 0 | 0 | 0 | 0 |
| 0 | 1 | 0 | 0 | 0 |
| 0 | 0 | 1 | 0 | 0 |
| 1 | 0 | 0 | 1 | 0 |
| 0 | 1 | 0 | 0 | 1 |
| 1 | 0 | 1 | 0 | 0 |
| 1 | 1 | 0 | 1 | 0 |
| 0 | 1 | 1 | 0 | 1 |
| 0 | 0 | 1 | 1 | 0 |
| 1 | 0 | 0 | 1 | 1 |
| 1 | 1 | 0 | 1 | 1 |
| 1 | 1 | 1 | 0 | 0 |
| 1 | 1 | 1 | 1 | 0 |

↑ t (SHIFT)

FIG. 4

PERMUTATION

| $a_4$ | $a_3$ | $a_2$ | $a_1$ | $a_0$ | |
|---|---|---|---|---|---|
| $x^2$ | $x^3$ | $x^4$ | $1$ | $x$ | |
| 1 | 1 | 1 | 1 | 1 | $= \alpha^{15}$ |
| 1 | 1 | 0 | 1 | 1 | $= \alpha^{16}$ |
| 1 | 0 | 0 | 1 | 1 | $= \alpha^{17}$ |
| 0 | 0 | 0 | 1 | 1 | $= \alpha^{18}$ |
| 0 | 0 | 1 | 1 | 0 | $= \alpha^{19}$ |
| 0 | 1 | 1 | 0 | 1 | $= \alpha^{20}$ |
| 1 | 1 | 0 | 0 | 0 | $= \alpha^{21}$ |
| 1 | 0 | 1 | 0 | 1 | $= \alpha^{22}$ |
| 0 | 1 | 1 | 1 | 1 | $= \alpha^{23}$ |
| 1 | 1 | 1 | 1 | 0 | $= \alpha^{24}$ |
| 1 | 1 | 0 | 0 | 1 | $= \alpha^{25}$ |
| 1 | 0 | 1 | 1 | 1 | $= \alpha^{26}$ |
| 0 | 1 | 0 | 1 | 1 | $= \alpha^{27}$ |
| 1 | 0 | 1 | 1 | 0 | $= \alpha^{28}$ |
| 0 | 1 | 0 | 0 | 1 | $= \alpha^{29}$ |
| 1 | 0 | 0 | 1 | 0 | $= \alpha^{30}$ |
| 0 | 0 | 0 | 0 | 1 | $= \alpha^{0}$ |
| 0 | 0 | 0 | 1 | 0 | $= \alpha^{1}$ |
| 0 | 0 | 1 | 0 | 0 | $= \alpha^{2}$ |
| 0 | 1 | 0 | 0 | 0 | $= \alpha^{3}$ |
| 1 | 0 | 0 | 0 | 0 | $= \alpha^{4}$ |
| 0 | 1 | 1 | 0 | 1 | $= \alpha^{5}$ |
| 0 | 1 | 0 | 1 | 0 | $= \alpha^{6}$ |
| 1 | 0 | 1 | 0 | 0 | $= \alpha^{7}$ |
| 0 | 1 | 1 | 0 | 1 | $= \alpha^{8}$ |
| 1 | 1 | 0 | 1 | 0 | $= \alpha^{9}$ |
| 1 | 0 | 0 | 0 | 1 | $= \alpha^{10}$ |
| 0 | 0 | 1 | 1 | 1 | $= \alpha^{11}$ |
| 0 | 1 | 1 | 1 | 0 | $= \alpha^{12}$ |
| 1 | 1 | 1 | 0 | 0 | $= \alpha^{13}$ |
| 1 | 1 | 1 | 0 | 1 | $= \alpha^{14}$ |

↑ (SHIFT)

SCRAMBLING/DESCRAMBLING CIRCUIT

BACKGROUND OF THE INVENTION

1. Field of the Invention

The present invention relates to a scrambling/descrambling circuit for data transmission using a clock recovery or self-clocking technique.

2. Description of the Prior Art

Figure 8:
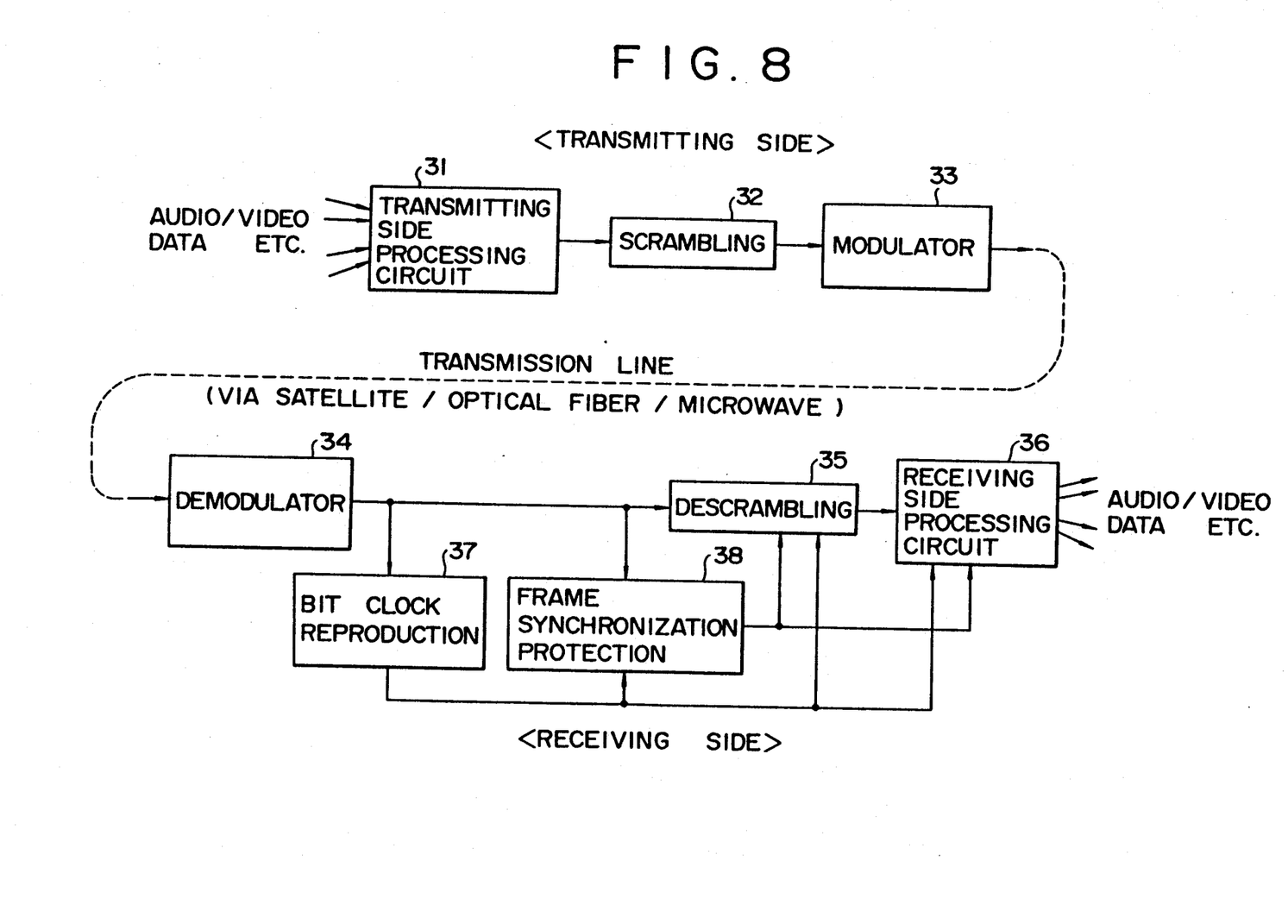
FIG. 8 is a block diagram illustrating the construction of a typical prior art data transmission system.

FIG. 8 is a block diagram of a typical conventional data transmission system. In FIG. 8, a transmitting side processing circuit 31 receives data to be transmitted, such as audio data and video data. The processing circuit 31 encodes and multiplexes the received data for output. A scrambling circuit 32 scrambles the data coming from the transmitting side processing circuit 31 and outputs the scrambled data to a modulator 33. The modulator 33 modulates the received data in accordance with a predetermined format and places the modulated data onto transmission lines of satellite, optical fiber and microwave circuits and the like.

A demodulator 34 demodulates the received signal and sends the demodulated data to a descrambling circuit 35. The descrambling circuit 35 descrambles the data it receives and outputs the descrambled data to a receiving side processing circuit 36. The receiving side processing circuit 36 decodes and branches the descrambled data it receives into the original audio data, video data and others.

A bit clock reproduction circuit 37 reproduces a bit clock signal from the data it receives from the demodulator 34. The bit clock signal is sent to a frame synchronization protection circuit 38, to the descrambling circuit 35 and to the receiving side processing circuit 36. The frame synchronization protection circuit 38 detects a frame signal from the data it receives from the demodulator 34. The detected frame signal is output to the descrambling circuit 35 and the receiving side processing circuit 36. The descrambling circuit 35 and the receiving side processing circuit 36 perform various kinds of processing by use of the reproduced bit clock signal from the bit clock reproduction circuit 37 and of the detected frame signal from the frame synchronization protection circuit 38.

As described, bit clock reproduction on the receiving side is made easier by having the scrambling circuit 32 scramble output data.

Figure 9:
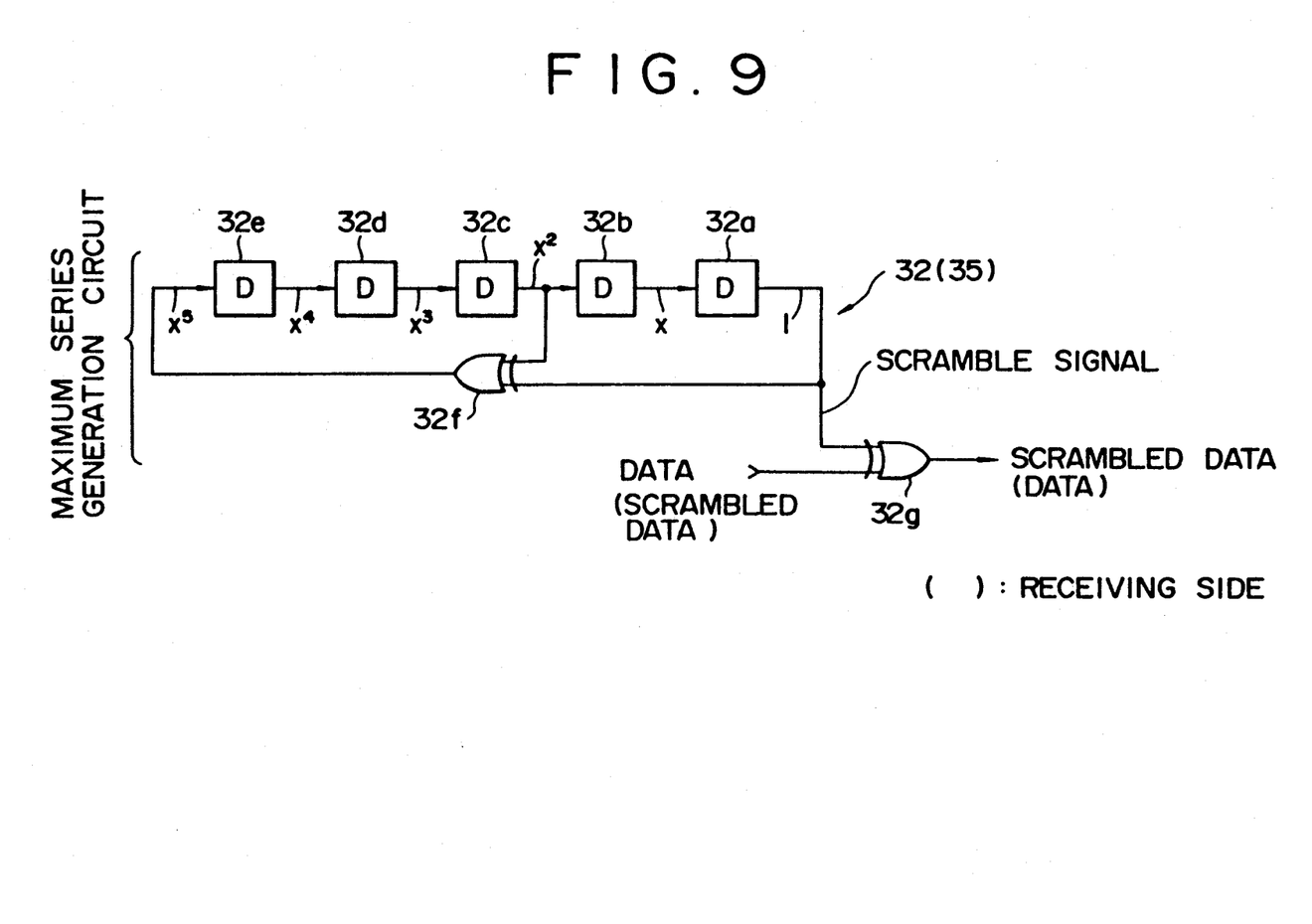
FIG. 9 is a circuit diagram a typical scrambling/descrambling circuit used in the system of FIG. 8.

The scrambling circuit 32 (descrambling circuit 35) is illustratively constructed as shown in FIG. 9. The scrambling (descrambling) circuit of FIG. 9 comprises delay circuits 32a through 32e, for successively delaying input data by one clock pulse each before output, and exclusive-OR gates 32f and 32g.

The output of the delay circuit 32e is supplied to the delay circuit 32d, the output of the latter being forwarded to the delay circuit 32c. Likewise, the output of the delay circuit 32c is sent to the delay circuit 32b whose output is in turn fed to the delay circuit 32a. The output of the delay circuit 32c and that of the delay circuit 32a are input to the exclusive-OR gate 32f. The output of the exclusive-OR gate 32f is input to the delay circuit 32e. The output of the delay circuit 32a is taken as a scramble signal (descramble signal) and is supplied to the input on one side of the exclusive-OR gate 32g. The input on the other side of the exclusive-OR gate 32g receives the data to be scrambled (or descrambled).

The exclusive-OR gate 32g outputs scrambled (or descrambled) data.

The above-described scrambling/descrambling circuit performs scrambling/descrambling using the following generating polynomial:

$$g(x) = x^5 + x^2 + 1$$

Figure 10:
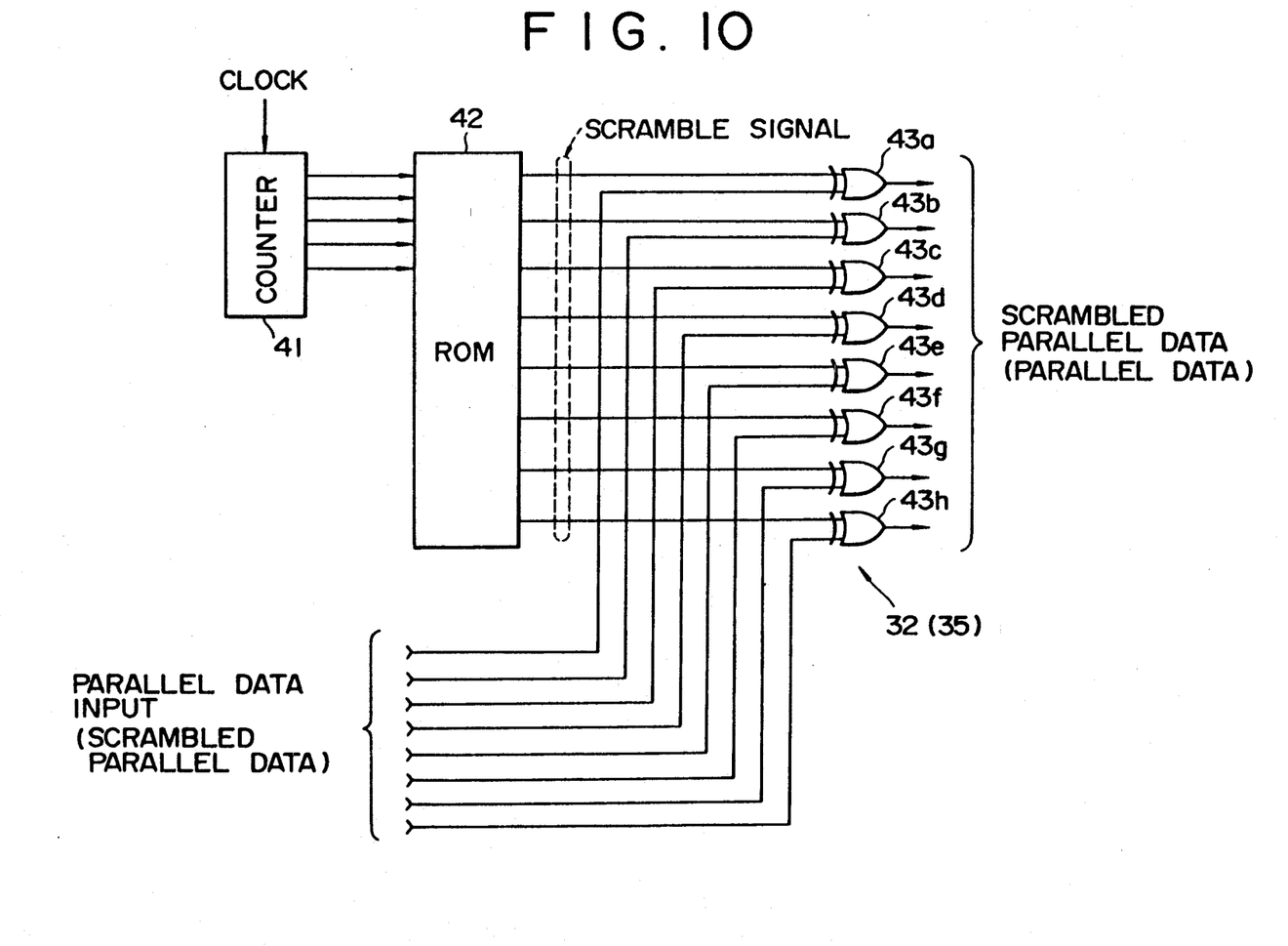
FIG. 10 is a circuit diagram of another Embodiment of a scrambling/descrambling circuit used in the system of FIG. 8.

The scrambling circuit 32 (or descrambling circuit 35) may be alternatively constructed as shown in FIG. 10. In FIG. 10, the scrambling circuit 32 comprises a counter 41, a ROM 42, and exclusive-OR gates 43a through 43h. This circuit, too, scrambles (or descrambles) signals using the same generating polynomial as that for the circuit of FIG. 9. In this case, the clock cycle is $31(2^5-1)$ since the generating polynomial above has degree five. The counter 41, which counts input clock pulses, supplies the ROM 42 with a count value between 0 and 31 as an address. In this example, eight exclusive-OR gates 43a through 43h process input data in parallel, eight bits at a time. Thus the ROM 42 contains beforehand 248 bits of data, the bit count being the least common multiple of 31 and 8. Every time an address is designated, eight bits of data are supplied to the inputs on one side of the exclusive-OR gates 43a through 43h. The inputs on the other side of the exclusive-OR gates 43a through 43h receive eight bits of parallel data to be scrambled (or descrambled). In this manner, the exclusive-OR gates 43a through 43h output the scrambled (or descrambled) data.

The typical scrambling (descrambling) circuit of FIG. 9 is required to operate at a bit clock rate commensurate with the transmission rate at which scrambled (or descrambled) data are output one bit at a time. One disadvantage of this arrangement is that in the TTL or CMOS process, the circuit operates at rates of tens of MBPS at most. That is, it is difficult for circuits of this type to transmit high-definition television (HDTV) data and the like to be transmitted at rates of 100 MBPS or higher. One ramification of this aspect is that the scrambling (descrambling) circuit can not be put into LSI format if manufactured as a CMOS arrangement; the circuit must be constructed as an ECL setup.

The scrambling (descrambling) circuit of FIG. 10 processes eight bits of data at a time. This means that the counter 41 need only operate at one-eighth of the bit transmission rate. However, if this circuit is to be constructed in discrete format, the need to incorporate the counter 41, ROM 42 and exclusive-OR gates 43a through 43h means not only higher cost but also more space to accommodate them. In LSI format, the circuit is required to allocate a disproportionately large space to the ROM 42. These disadvantages are increasingly pronounced as the degree of the generating polynomial is raised. Thus, under the prior art constraints it is difficult to adopt a generating polynomial of a substantially high degree in connection with the manufacture of the scrambling/descrambling circuit.

SUMMARY OF THE INVENTION

It is therefore an object of the present invention to provide a scrambling/descrambling circuit which is manufactured as a CMOS arrangement in LSI format at low cost, and which allows the generating polynomial involved to have a high degree.

In carrying out the invention and according to one aspect thereof, there is provided a scrambling/descrambling circuit for scrambling/descrambling in parallel "m" bits using a maximum length series of degree "n," the circuit comprising: "m" exclusive-OR gates having the inputs on one side thereof receive "m" bits of input data, one bit corresponding to one gate input; "p" multiplication circuits for multiplying for output the input data by $\alpha^m$ in a Galois group given by a generating polynomial of the maximum length series of the degree "n", where $\alpha$ is the generating element; and "n×p" registers for latching "n×p" bits of data output by the multiplication circuits and for outputting the latched "n×p" bits back to the multiplication circuits, the value "n×p" being not smaller than the value "m", the "m" bits of the latched data being output to the inputs on the other side of the exclusive-OR gates, one bit corresponding to one gate input.

In the scrambling/descrambling circuit of the above construction, the scramble (or descramble) signal output by the registers and multiplied by $\alpha^m$ is input back to the registers. Thus the circuit many be put into LSI format as a CMOS arrangement that is manufactured at low cost and is free of constraints on the degree of the generating polynomial adopted.

Further objects, features and advantages of the invention will become more apparent upon a reading of the following description and appended drawings.

DESCRIPTION OF THE PREFERRED EMBODIMENT

Figure 1:
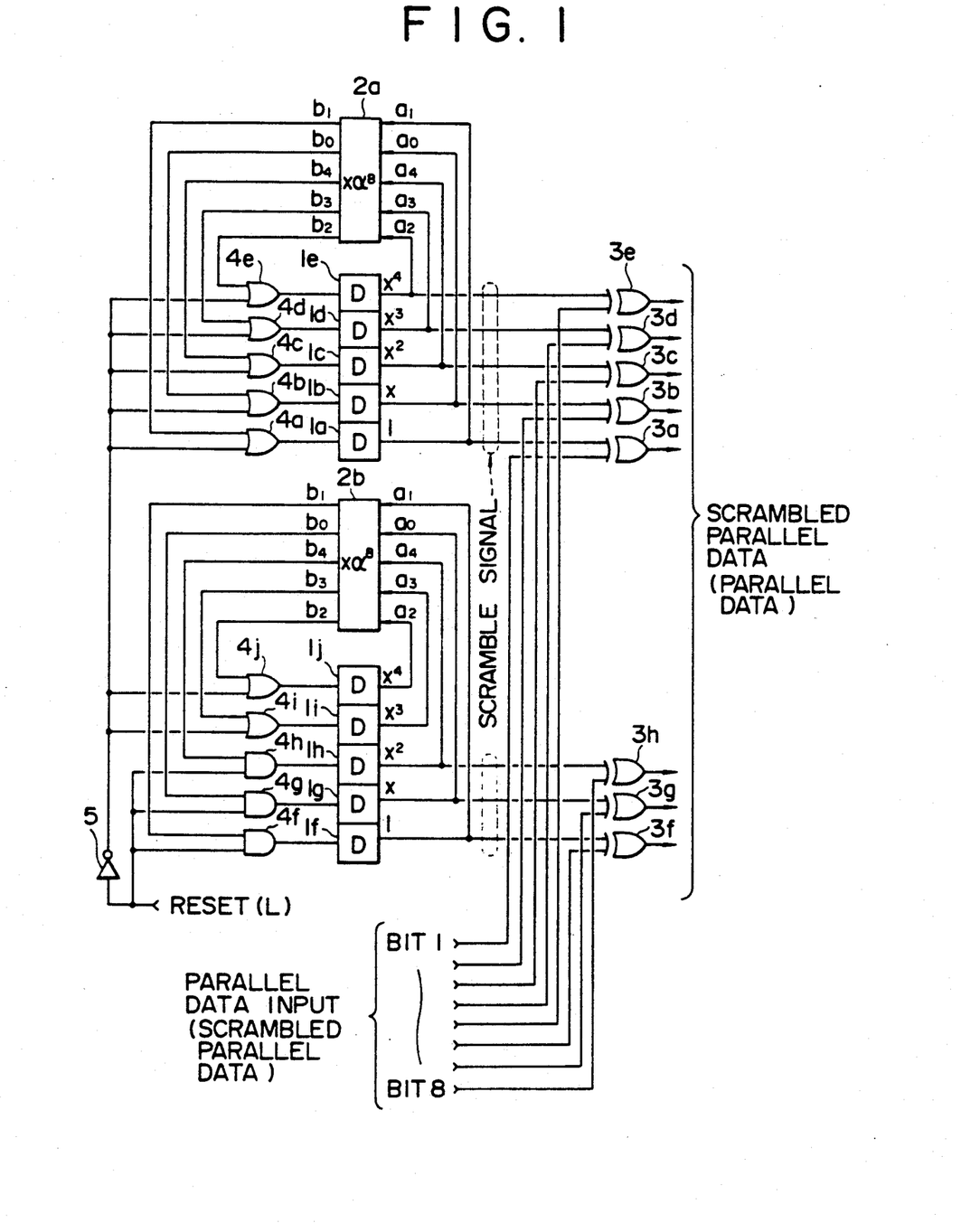
FIG. 1 is a circuit diagram of a scrambling/descrambling circuit embodying the invention.

FIG. 1 is a circuit diagram of a scrambling/descrambling circuit embodying the present invention. In this embodiment, eight bits of parallel data are supplied to the inputs on one side of exclusive-OR gates 3a through 3h. The inputs on the other side of the exclusive-OR gates 3a through 3h are supplied with the outputs from registers 1a through 1h, respectively. The outputs of the registers 1a through 1e are input to a multiplication circuit 2a. The output of the multiplication circuit 2a is sent back to the registers 1a through 1e via exclusive-OR gates 4a through 4e. Likewise, the outputs of registers 1f through 1j are also input to a multiplication circuit 2b; the output of the multiplication circuit 2b is sent back to the registers 1f through 1j via AND gates 4f through 4h and OR gates 4i and 4j. A reset signal is supplied via an inverter 5 to the OR gates 4a through 4e and the OR gates 4i and 4j. A reset signal is sent univerted to the AND gates 4f through 4h.

Figure 2:
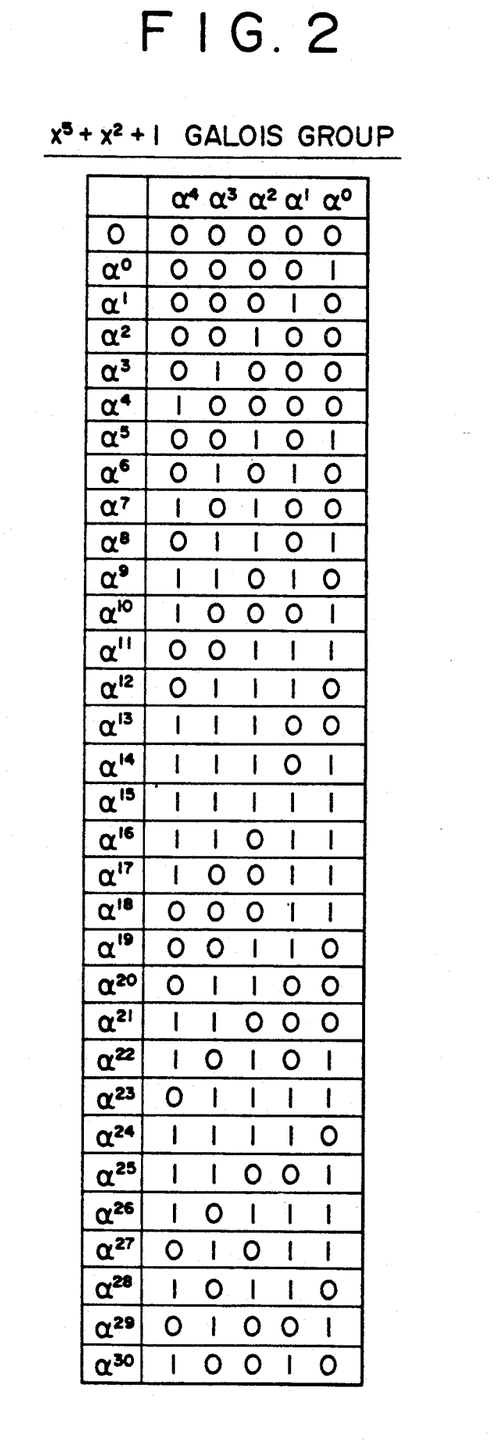
FIG. 2 is a chart describing the Galois group of a typical generating polynomial.
Figure 3:
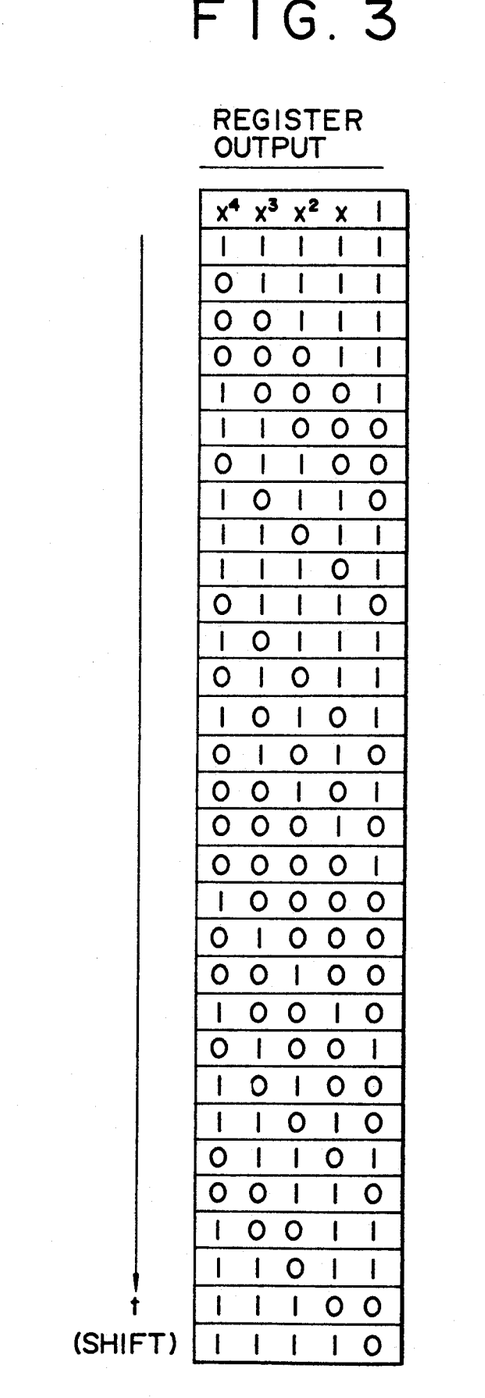
FIG. 3 is a chart depicting register outputs in connection with the circuit shown in FIG. 9.
Figure 4:
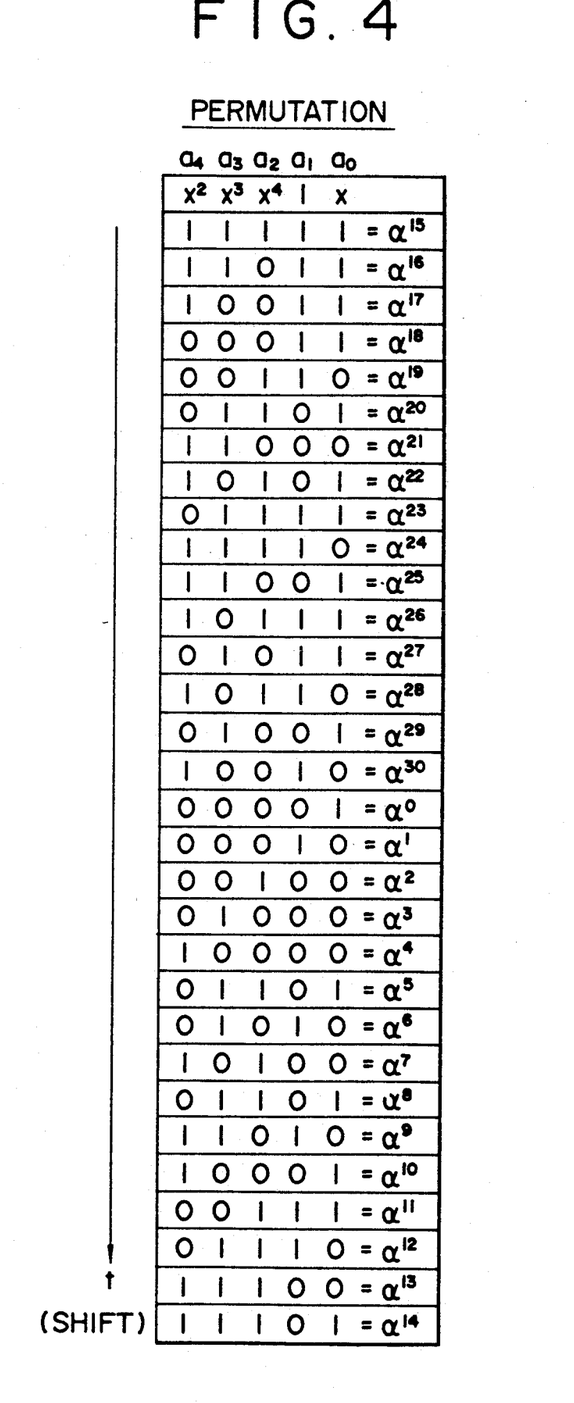
FIG. 4 is a chart rearranging the values in FIG. 3 for comparison with FIG. 2.

The embodiment above generates a scramble (or descramble) signal using the same generating polynomial $$x^5 + x^2 + 1$$

that is used in the prior art example. This polynomial has 31 Galois group generating elements ($\alpha$), as shown in FIG. 2. FIG. 3 depicts the outputs of the registers 32e through 32a in FIG. 9 (output: each of terms $x^4$, $x^3$, $x^2$, $x^1$ and $x^0$), the vertical axis representing the time base. FIG. 4 indicates how the register outputs of FIG. 3 are rearranged in the order of generating element degrees beginning with the reset state in which all values are set to "1."

Figure 5:
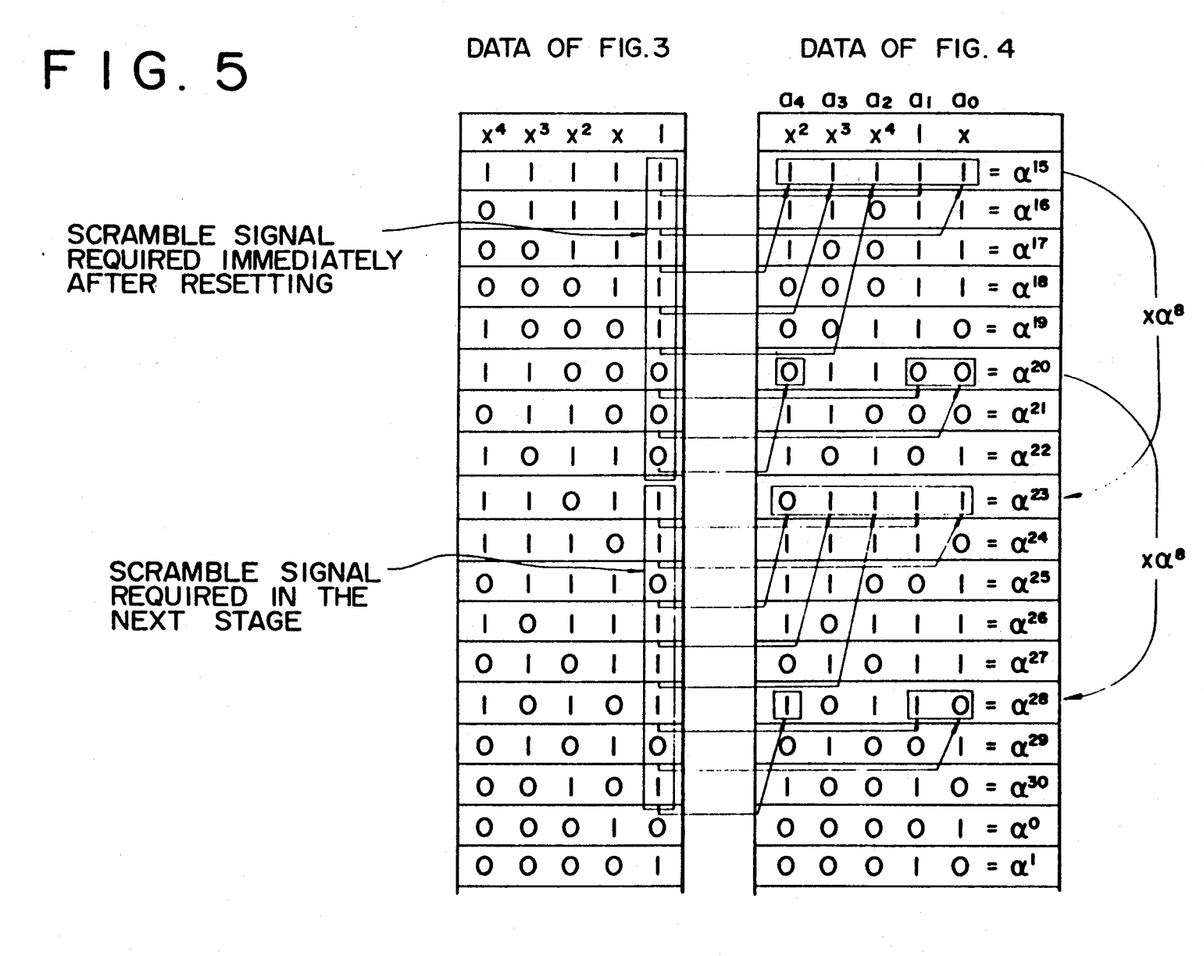
FIG. 5 is a chart showing how the values in FIG. 3 are related to those in FIG. 4.

Referring to FIG. 5, how FIGS. 3 and 4 are related to each other will now be described. The outputs of the first eight clock pulses from the register 32a are "11111000." The first through the fifth 1's correspond respectively to the values in terms 1, x, $x^2$, $x^3$ and $x^4$ of $\alpha^{15}$ in FIG. 4. The sixth through the eighth 0's correspond respectively to 0's in terms 1, x and $x^2$ of $\alpha^{20}$ in FIG. 4.

Likewise, the ninth through the 18th outputs of term $1(x^0)$ in FIG. 3 are "11011101." Of these outputs, the first five values "11011" correspond respectively to the values in terms 1, x, $x^2$, $x^3$ and $x^4$ of $\alpha^{23}$ in FIG. 4; the last three values "101" correspond respectively to the values in terms 1, x and $x^2$ of $\alpha^{28}$ in FIG. 4.

With respect to degrees of the generating element $\alpha$, $\alpha^{23}$ is $\alpha^{15}$ multiplied by $\alpha^8$, and $\alpha^{28}$ equals $\alpha^{20}$ multiplied by $\alpha^8$. That is, the value of term $1(x^0)$ in FIG. 3 (i.e., output of register 32a in FIG. 9) appears at intervals of $\alpha^8$ in FIG. 4.

It is on the above preconditions that the circuit of FIG. 1 is constructed. In initial state, a logically low (0) reset signal is turned into a logically high (1) reset signal by the inverter 5 before being supplied to the OR gates 4a through 4e, 4i and 4j. This sets the registers 1a through 1e, 1i and 1j to "1" each. Meanwhile, the reset signal "0" is input uninverted to the AND gates 4f through 4h. This sets the registers 1f through 1h to "0" each.

The registers 1a through 1e correspond to the terms 1, x, $x^2$, $x^3$ and $x^4$ of the generating polynomial, respectively. Similarly, the registers 1f through 1j correspond respectively to the terms 1, x, $x^2$, $x^3$ and $x^4$ of the generating polynomial.

Assume that the outputs "11111" of the registers 1a through 1e are keyed to the terms of $\alpha^{15}$ and the outputs "000" of the registers 1f through 1h keyed to the terms of $\alpha^{20}$. In this case, the outputs "11111000" of the registers 1a through 1h take on the values shown in FIG. 5.

After a reset in initial state, the reset signal is brought High (1). As a result, the inputs on one side of the OR gates 4a through 4e, 4i and 4j receive "0" each. This causes the inputs on the other side of these OR gates to pass values unchanged therethrough. The inputs on one side of the AND gates 4f through 4h also receive "1" each. This causes the inputs on the other side of these AND gates to pass values unchanged therethrough. After this, the outputs $b_1$, $b_0$, $b_4$, $b_3$ and $b_2$ of the multiplication circuit 2a are supplied to the registers 1a through 1e via the OR gates 4a through 4e. Likewise, the outputs $b_1$, $b_0$, $b_4$, $b_3$ and $b_2$ of the multiplication circuit 2b are input to the registers 1f through 1j via the AND gates 4f through 4h and the OR gates 4i and 4j.

Below is a description of inputs and outputs in connection with the multiplication circuits 2a and 2b. Using the equation below for a Galois group, the multiplication circuit 2a (as well as the circuit 2b) multiplies by $\alpha^8$ the inputs $a_1$, $a_0$, $a_4$, $a_3$ and $a_2$ from the registers 1a through 1e:

$$\alpha^8(a_0+a_1\alpha+a_2\alpha^2+a_3\alpha^3+a_4\alpha^4)= \\ a_0\alpha^8+a_1\alpha^9+a_2\alpha^{10}+a_3\alpha^{11}+a_4\alpha^{12} \quad (1)$$

Comparing FIG. 2 with FIG. 4 reveals that $x^2$, $x^3$, $x^4$, $1(x^0)$ and x of FIG. 4 correspond respectively to $\alpha^4$, $\alpha^3$, $\alpha^2$, $\alpha^1$ and $\alpha^0$ of FIG. 2. Thus the coefficients $a_4$ through $a_0$ (i.e., outputs of registers 1a through 1e) in equation (1) correspond to the values of $X^2$, $x^3$, $x^4$, 1 and x of FIG. 4, respectively, as shown below:

$a_4 \ldots x^2$
$a_3 \ldots x^3$
$a_2 \ldots x^4$
$a_1 \ldots 1$
$a_0 \ldots x$ If the generating polynomial G(x) is set for 0, then $$\alpha^5+\alpha^2+1=0 \quad (2)$$

thus $$\alpha^5+\alpha^2+1 \quad (3)$$

If equation (2) is multiplied by $\alpha$, then $$\alpha^6+\alpha^3+\alpha=0 \quad (4)$$

thus $$\alpha^6=\alpha^3+\alpha \quad (5)$$

If equation (4) is multiplied by $\alpha$, then $$\alpha^7+\alpha^4+\alpha^2=0 \quad (6)$$

thus $$\alpha^7=\alpha^4+\alpha^2 \quad (7)$$

By multiplying equation (6) by $\alpha$ and substituting equation (3) therefor, one gets $$\alpha^8+\alpha^5+\alpha^3=\alpha^8+(\alpha^2+1)+\alpha^3=0 \quad (8)$$

thus $$\alpha^8=\alpha^3+\alpha^2+1 \quad (9)$$

Likewise, by multiplying equation (8) by $\alpha$ and substituting equation (5) therefor, one gets $$\alpha^9+\alpha^6+\alpha^4=\alpha^9+(\alpha^3+\alpha)+\alpha^4=0 \quad (10)$$

thus $$\alpha^9=\alpha^4+\alpha^3+\alpha \quad (11)$$

Likewise, from the equation $$\alpha^{10}+\alpha^7+\alpha^5=\alpha^{10}+(\alpha^4+\alpha^2)+(\alpha^2+1)=0 \quad (12)$$

one gets $$\alpha^{10}=\alpha^4+1 \quad (13)$$

From the equation $$\alpha^{11}+\alpha^8+\alpha^6=\alpha^{11}+(\alpha^3+\alpha^2+1)+(\alpha^3+\alpha)=0 \quad (14)$$

one gets $$\alpha^{11}=\alpha^2+\alpha+1 \quad (15)$$

Furthermore, from the equation $$\alpha^{12}+\alpha^9+\alpha^7=\alpha^{12}+(\alpha^4+\alpha^3+\alpha) \\ +(\alpha^4+\alpha^2)=0 \quad (16)$$

one gets $$\alpha^{12}=\alpha^3+\alpha^2+\alpha \quad (17)$$

By substituting equations (9), (11), (13), (15) and (17) for equation (1), one gets $$\begin{aligned}
a_0\alpha^8 + a_1\alpha^9 + a_2\alpha^{10} + a_3\alpha^{11} + a_4\alpha^{12} &= a_0(\alpha^3 + \alpha^2 + 1) + \\
&\quad a_1(\alpha^4 + \alpha^3 + \alpha) \\
&\quad + a_2(\alpha^4 + 1) + \\
&\quad a_3(\alpha^2 + \alpha + 1) \\
&\quad + a_4(\alpha^3 + \alpha^2 + \alpha) \\
&= (a_0 + a_2 + a_3) + \\
&\quad (a_1 + a_3 + a_4)\alpha \\
&\quad + (a_0 + a_3 + a_4)\alpha^2 \\
&\quad + (a_0 + a_1 + a_4)\alpha^3 \\
&\quad + (a_1 + a_2)\alpha^4 \\
&= b_0 + b_1\alpha + b_2\alpha^2 \\
&\quad + b_3\alpha^3 + b_4\alpha^4
\end{aligned} \quad (18)$$

That is, $$b_0=a_0+a_2+a_3 \quad (19)$$

$$b_1=a_1+a_3+a_4 \quad (20)$$

$$b_2=a_0+a_3+a_4 \quad (21)$$

$$b_3=a_0+a_1+a_4 \quad (22)$$

$$b_4=a_1+a_2 \quad (23)$$

The values $b_0$ through $b_4$ are latched by the registers 1b, 1a, 1e, 1d and 1c (or 1g, 1f, 1j, 1i and 1h), to become the next new values $a_0$ through $a_4$.

When the values $$a_0=a_1=a_2=a_3=a_4=1$$

of $\alpha^{15}$ are substituted for equations (19) through (23), one gets $$b_0=b_1=b_2=b_3=1$$

$$b_4=0$$

as the values $a_0$ ($b_0$) through $a_4$ ($b_4$) in $$\alpha^{23}(=\alpha^{15}\times\alpha^8)$$

The above multiplication process is carried out by the multiplication circuit 2a.

When the values $$a_4 = a_1 = a_0 = 0$$

$$a_3 = a_2 = 1$$

of $\alpha^{20}$ are substituted for equations (19) through (23), one gets $$b_4 = b_2 = b_1 = 1$$

$$b_3 = b_0 = 0$$

as the values $a_0$ ($b_0$) through $a_4$ ($b_4$) in $$\alpha^{28}(=\alpha^{20} \times \alpha^8)$$

The above multiplication process is carried out by the multiplication circuit 2b.

In the manner described, the data latched by the registers 1a through 1h are supplied simultaneously to the inputs on one side of the exclusive-OR gates 3a through 3h as scramble/descramble data. This causes the eight-bit data fed to the inputs on the other side of the same gates to be scrambled/descrambled simultaneously.

Because eight-bit data are processed at the same time, the registers 1a through 1i and the multiplication circuits 2a and 2b need only operate at one-eighth of the bit transmission rate.

Figure 6:
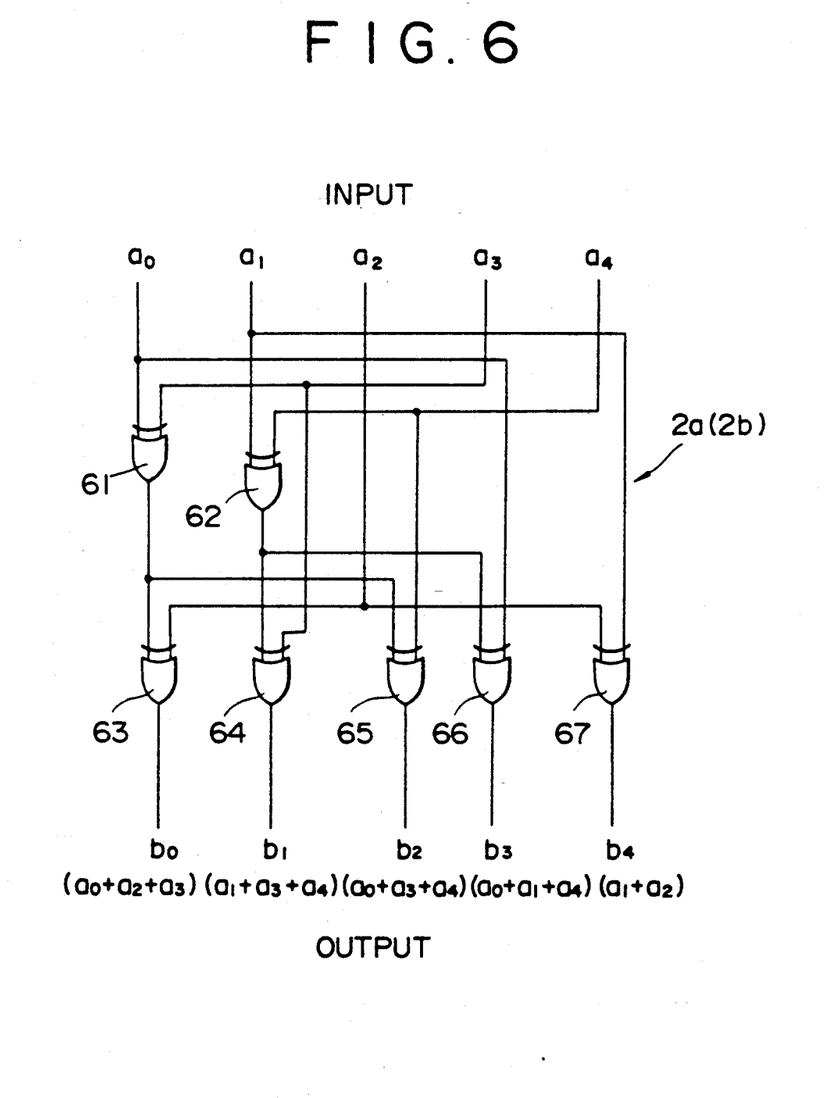
FIG. 6 is a circuit diagram of a circuit embodying a multiplication circuit contained in the embodiment of FIG. 1.

FIG. 6 is a circuit diagram of a circuit embodying the multiplication circuit 2a (2b). As illustrated, the embodied multiplication circuit 2a (2b) comprises seven exclusive-OR gates 61 through 67. The exclusive-OR gate 61 gets $a_0$ and $a_3$ exclusive-OR'ed and outputs the result to the exclusive-OR gate 63. In turn, the exclusive-OR gate 63 gets the received gate output and $a_2$ exclusive-OR'ed and outputs $b_0$ ($a_0 + a_2 + a_3$). The exclusive-OR gate 62 gets $a_1$ and $a_4$ exclusive-OR'ed and sends the result to the exclusive-OR gate 64. In turn, the exclusive-OR gate 64 gets the received gate output and $a_3$ exclusive-OR'ed and outputs $b_1$ ($a_1 + a_3 + a_4$). The exclusive-OR gate 65 gets the output ($a_0 + a_3$) of the exclusive-OR gate 61 and $a_4$ exclusive-OR'ed and outputs $b_2$ ($a_0 + a_3 + a_4$). The exclusive-OR gate 66 gets the output ($a_1 + a_4$) of the exclusive-OR gate 62 and $a_0$ exclusive-OR'ed and outputs $b_3$ ($a_0 + a_1 + a_4$). The exclusive-OR gate 67 gets $a_1$ and $a_2$ exclusive-OR'ed and outputs $b_4$ ($a_1 + a_2$).

Figure 7:
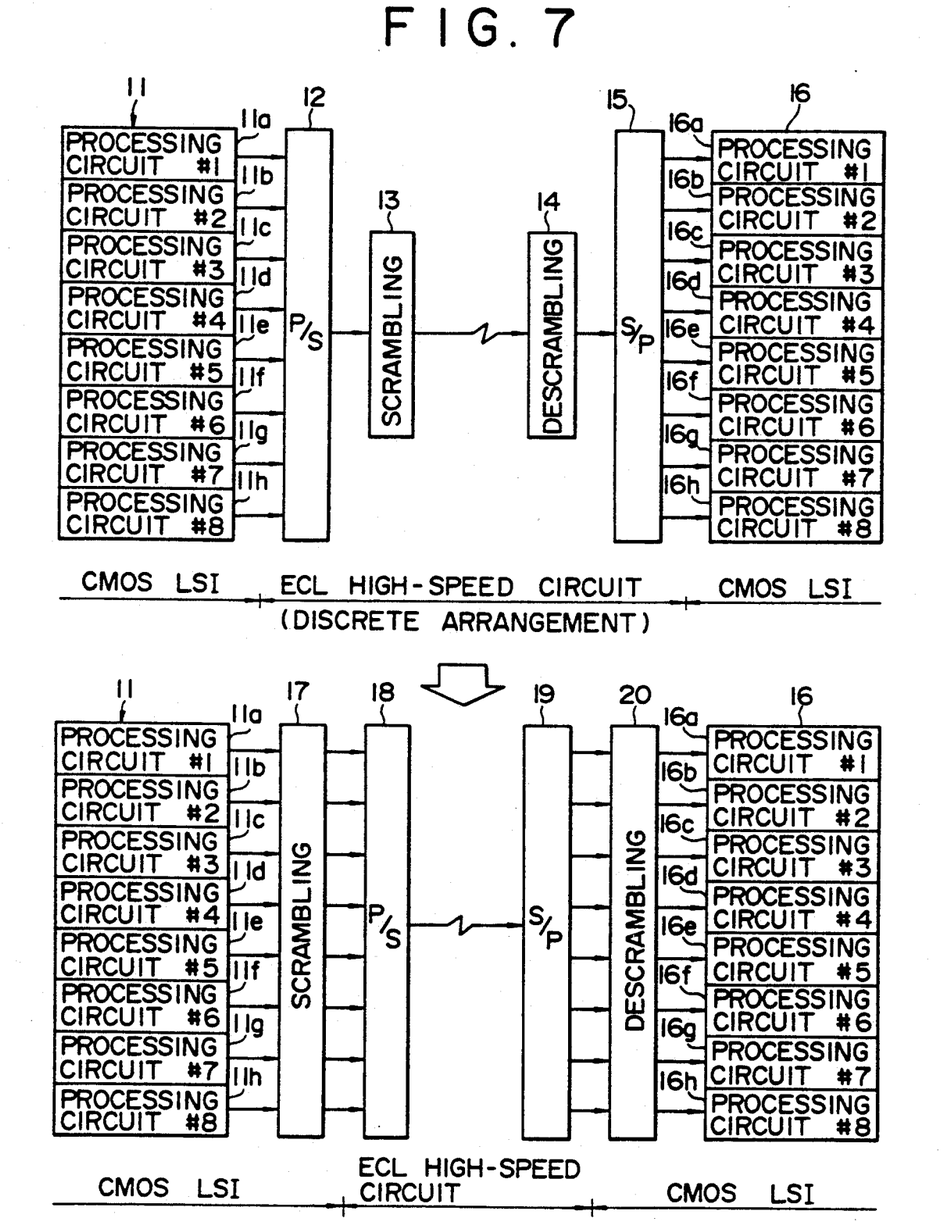
FIG. 7 is a block diagram depicting the construction of a data transmission system using the scrambling/descrambling circuit of FIG. 1.

FIG. 7 shows a typical data transmission system that utilizes the scrambling/descrambling circuit described above, as opposed to a typical prior art system.

Conventionally, processing circuits 11 (11a through 11h) on the transmitting side process eight-bit data in parallel and send the processed data to a parallel-to-serial conversion circuit 12 for conversion to serial data. The output of the parallel-to-serial conversion circuit 12 is scrambled by a scrambling circuit 13, the scrambled data being placed onto a transmission line. On the receiving side, a descrambling circuit 14 descrambles the data coming over the transmission line. The output of the descrambling circuit 14 is converted by a serial-to-parallel conversion circuit 15 to parallel data for processing by processing circuits 16 (16a through 16h). Because the processing circuits 11 and 16 need only operate at one-eighth of the bit transmission rate, they may be manufactured in LSI format as a low-speed, inexpensive CMOS arrangement. With the prior art, however, the parallel-to-serial conversion circuit 12, serial-to-parallel conversion circuit 15, scrambling circuit 13 and descrambling circuit 14 must be constructed discretely in a highspeed, expensive ECL arrangement each.

By contrast, the scrambling/descrambling circuit embodying the invention may operate at low speed because it processes eight bits in parallel. Thus the processing circuits 11, scrambling circuit 17, processing circuits 16 and descrambling circuit 20 can be manufactured in LSI format as a CMOS arrangement. Only the parallel-to-serial conversion circuit 18 and serial-to-parallel conversion circuit 19 need to be constructed as an ECL arrangement that operates at high speed.

Thus according to the invention, the data processed by the processing circuits 11 on the transmitting side are scrambled by the scrambling circuit 17, followed by conversion from parallel to serial format. On the receiving side, the data are converted from serial to parallel format before being descrambled.

Because the embodiment of the invention allows data to be output "as scrambled" from the LSI, the scrambling process provides not only for clock recovery (self-clock) but also for better data security. Furthermore, because the scope of the circuit is reduced and the power consumption involved is lowered, the overall cost is suppressed while circuit reliability is enhanced.

In the above-described embodiment, the values of $a_1$, $a_0$, $a_4$, $a_3$ and $a_2$ are initialized to "11111" (in registers 1a through 1e) or to "00011" (in registers 1f through 1j). Alternatively, these initial values may be changed or the generating polynomial in use may be altered for data protection purposes.

In the embodiment above, the degree "n" of the maximum length series is 5, the number "n" of bits for parallel processing is 8, and the number "p" of multiplication circuits is 2 (2a, 2b). However, these settings are for illustrative purposes only and are not to be construed as limiting the invention.

As described, the scrambling/descrambling circuit according to the invention multiplies scramble/descramble data by $\alpha^m$ to generate new scramble/descramble data. This scheme makes it possible to keep the processing speed low where the bit transmission rate is high. This in turn allows the circuit to be manufactured as an inexpensive CMOS arrangement in LSI format. Because no ROM is employed, the LSI setup is easy to make, with no constraints on the degree "n" of the generating polynomial or on the number "m" of bits to be processed. As a result, the scrambling/descrambling circuit may be downsized significantly.

As many apparently different embodiments of this invention may be made without departing from the spirit and scope thereof, it is to be understood that the invention is not limited to the specific embodiments thereof except as defined in the appended claims.

What is claimed is:

1. A scrambling circuit for scrambling in parallel "m" bits using a maximum length series of degree "n", said circuit comprising:

"m" exclusive-OR gates having first respective inputs thereof connected to receive "m" bits of input data to be scrambled, one bit corresponding to one gate input;

"p" multiplication circuits for multiplying data fed thereto by $\alpha^m$ in a Galois group given by a generating polynomial of said maximum length series of said degree "n", where α is the generating element of the polynomial; and "n×p" registers for latching "n×p" bits of data output by said "p" multiplication circuits and for outputting the latched "n×p" bits of data respectively back as inputs to said "p" multiplication circuits, wherein the value "n×p" is not smaller than the value "m", and the "m" bits of said latched data are output respectively to the other inputs of said exclusive-OR gates, one bit corresponding to one gate input, outputs of said "m" exclusive-OR gates comprising scrambled input data.

2. A scrambling circuit according to claim 1, wherein said input data are "m" bit parallel data and wherein said exclusive-OR gates output scrambled parallel data.

3. A scrambling circuit according to claim 1, wherein said scrambling circuit is constituted at least by a CMOS arrangement in LSI format.

4. A descrambling circuit for descrambling in parallel "m" bits using a maximum length series of degree "n", said circuit comprising:

"m" exclusive-OR gates having first inputs thereof respectively connected to receive "m" bits of input data to be descrambled, one bit corresponding to one gate input;

"p" multiplication circuits for multiplying data fed thereto by $\alpha^m$ in a Galois group given by a generating polynomial of said maximum length series of said degree "n", where α is the generating element of the polynomial; and "n×p" registers for latching "n×p" bits of data output by said "p" multiplication circuits and for outputting the latched "n×p" bits of data respectively back as inputs to said "p" multiplication circuits, wherein the value "n×p" is not smaller than the value "m", and the "m" bits of said latched data are output respectively to the other inputs of said exclusive-OR gates, one bit corresponding to one gate input, outputs of said "m" exclusive-OR gates comprising descrambled input data.

5. A descrambling circuit according to claim 4, wherein said input data are scrambled parallel data and wherein said exclusive-OR gates output "m" bit parallel data.

6. A descrambling circuit according to claim 5, wherein said descrambling circuit is constituted at least by a CMOS arrangement in LSI format.

7. A data transmission system comprising a transmitting section for scrambling data, means for modulating and transmitting the scrambled data, means for receiving and demodulating the transmitted data, and a receiving section for descrambling the demodulated data;

said transmitting section containing a scrambling circuit and said receiving section containing a descrambling circuit;

said scrambling and said descrambling circuits respectively scrambling and descrambling "m" bits in parallel using a maximum length series of degree "n", and wherein each of said scrambling and descrambling circuits comprises:

"m" exclusive-OR gates each having one input thereof connected to receive respective "m" bits of input data, one bit corresponding to one gate input;

"p" multiplication circuits for multiplying data fed thereto by $\alpha^m$ in a Galois group given by a generating polynomial of said maximum length series of said degree "n", where α is the generating element of the polynomial; and "n×p" registers for latching "n×p" bits of data output by said "p" multiplication circuits and for outputting the latched "n×p" bits of data respectively back as inputs to said "p" multiplication circuits, wherein the value "n×p" is not smaller than the value "m", and the "m" bits of said latched data are output to the respective other inputs of said "m" exclusive-OR gates, one bit corresponding to one gate input.

8. A data transmission system according to claim 7, wherein said receiving section includes a reproduction circuit for reproducing a bit clock signal contained in said demodulated data.

9. A data transmission system according to claim 8, wherein said system transmits satellite broadcasting data.

* * * * *